United States Patent [19]
Martin

[11] 3,948,578
[45] Apr. 6, 1976

[54] BEARINGS
[75] Inventor: Jacques Lucien Joseph Martin, Paris, France
[73] Assignee: Societe Anonyme dite: R.K.S., Avallon, France
[22] Filed: Mar. 13, 1974
[21] Appl. No.: 450,685

[30] Foreign Application Priority Data
Mar. 20, 1973  France .............. 73.09979

[52] U.S. Cl. .................. 308/214; 29/148.4 C
[51] Int. Cl.² ........................... F16C 33/00
[58] Field of Search ........ 308/202, 207 R, 213, 214, 308/207; 29/84, 148.4, 148.4 A, 148.4 C

[56] References Cited
UNITED STATES PATENTS

| | | | |
|---|---|---|---|
| 2,160,420 | 5/1939 | Scribner | 308/214 |
| 2,447,928 | 8/1948 | Bergstrom | 308/214 |
| 2,747,951 | 5/1956 | Wallgren | 308/214 |

*Primary Examiner*—M. H. Wood, Jr.
*Assistant Examiner*—Richard A. Bertsch
*Attorney, Agent, or Firm*—Stevens, Davis, Miller & Mosher

[57] ABSTRACT

A bearing having two rows of cylindrical oblique contact rollers, each row being located in an annular space defined between two annular monobloc race members, the annular spaces containing surfaces which are loaded by and form tracks for the rollers and other surfaces which are non-loaded, one of the race members having a filling orifice which extends into one of the annular spaces through one of the non-loaded surfaces and through which the rollers with or without a cage can be inserted into the space.

7 Claims, 2 Drawing Figures

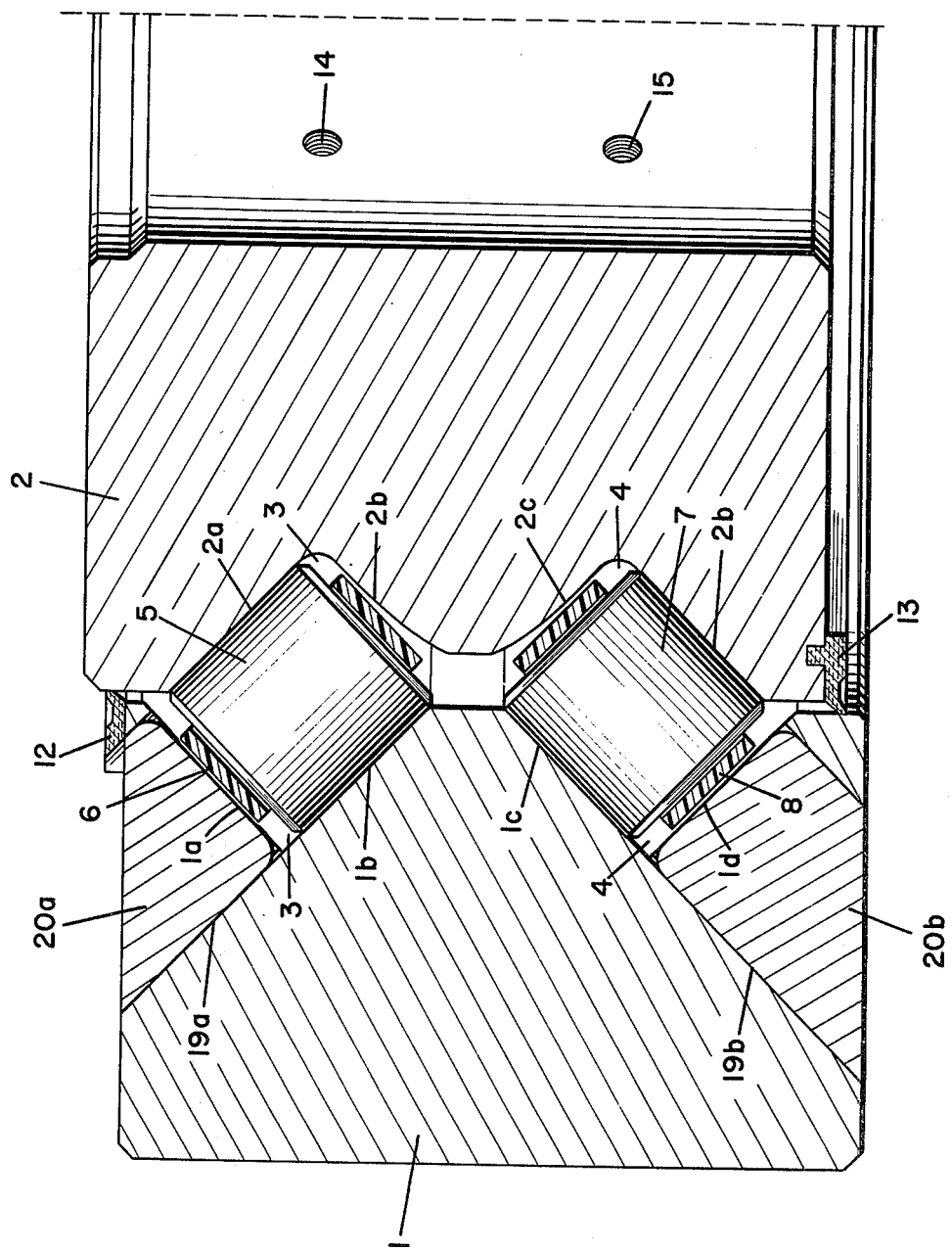

BEARINGS

BACKGROUND OF THE INVENTION

This invention relates to bearings having two rows of oblique contact rolling members arranged between two annular monobloc race members.

Bearings with two rows of oblique contact rolling bearings arranged between two annular monobloc rod members are known in which the balls are introduced between the two race members, for example, by means of a filling slot on each of the two race members. Its assembly may be also performed by expansion.

Cylindrical roller bearings with monobloc race members are also known wherein the rollers are arranged in a successively crossed manner. Assembly of these bearings necessitates the use of filling holes provided in one of the race members for introducing the rollers into the bearing and according to French Patent No. 7,123,210, each of these holes can be filled with a filler plug. This plug has to be machined with particular care because one of its faces forms part of the track on the race member and it must be very carefully fixed so that impairment of the rolling qualities of the bearing is kept to a minimum. The track is machined appropriately with the plug in position but even so the existence of such a plug in a loaded rolling zone is always a disadvantage.

According to the present invention, a bearing has two rows of cylindrical oblique contact rollers, each row being located in an annular space defined between two annular monobloc race members. The annular spaces contain surfaces which are loaded by and form tracks for the rollers and other surfaces which are non-loaded. One of the race members has a filling orifice which extends into one of the annular spaces through one of the non-loaded surfaces and through which the rollers with or without a cage can be inserted into the space.

Thus the new bearing has greatly superior mechanical characteristics because the absence of the filler plug on the tracks of the race members permits greater axial and radial loads than in the previous bearings.

SUMMARY OF THE INVENTION

In one preferred embodiment of the invention one of the race members is provided with an orifice which extends into both annular spaces through a non-loaded surface in each; the orifice is closed by a plug. According to another preferred embodiment of the invention, one of the race members is provided with two orifices, each orifice extends into one of the annular spaces through a non-loaded surface, and each orifice is closed by a plug. In either case, the roller cage may be in the form of window guides and is inserted at the same time as the rollers. In each embodiment the plug can be made from a plastic material or of the same material as the race members. The bearings according to the invention can be assembled in prestressed manner or with a clearance.

BRIEF DESCRIPTION OF THE DRAWING

Two embodiments of the invention will be described below with reference to the accompanying drawing figures, wherein:

FIG. 2 shows a modification of the embodiment of FIG. 1.

DESCRIPTION OF THE PREFERRED EMBODIMENTS

Figure 1:
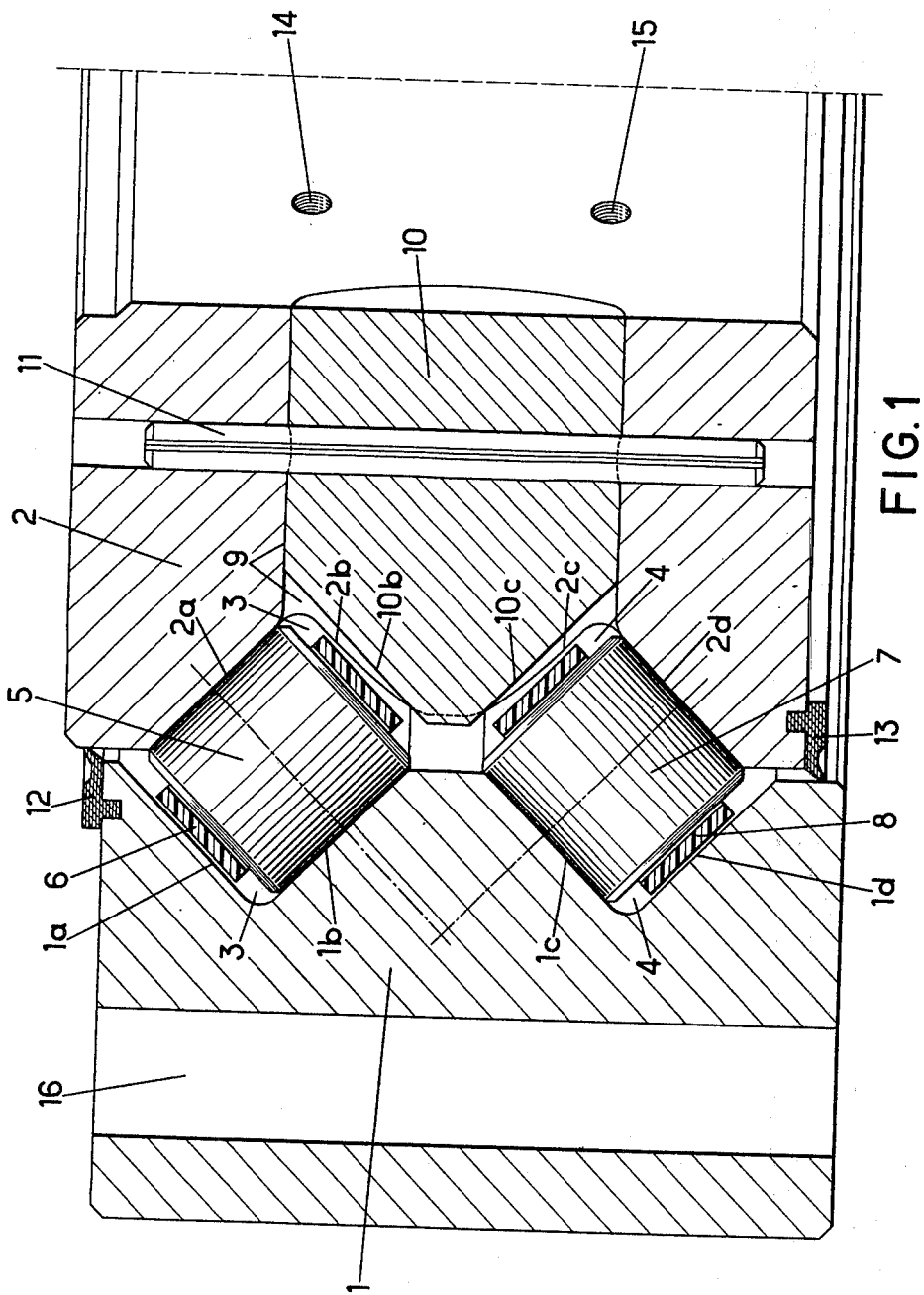
FIG. 1 shows a cross-sectional view of part of a bearing with two rows of cylindrical oblique contact rollers of the O-type between monobloc race members.

An outer annular race member 1 is of monobloc construction and has truncated cone-shaped surfaces 1a, 1b, 1c and 1d on its inner wall. An inner annular race member 2 is also of monobloc construction and also has truncated cone-shaped surfaces 2a, 2b, 2c and 2d which respectively face surfaces 1a, 1b, 1c and 1d.

The truncated cone-shaped surfaces 1a and 1b of outer race member 1 and the truncated cone-shaped surfaces 2a and 2b of inner race member 2 define a first annular space 3; in the same way truncated cone-shaped surfaces 1c and 1d of outer race member 1 and truncated cone-shaped surfaces of inner race member 2 define a second annular space 4. The first annular space 3 contains a first series of cylindrical roller bearings 5 in a roller cage in the form of window guides 6 and the second annular space 4 contains a second series of bearings 7 in window guides 8.

The inner race member 2 has a filling orifice 9 which extends into the truncated cone-shaped surfaces 2b, 2c. A plug 10 with two planar surfaces 10b, 10c closes filling orifice 9 and is held in place by a pin 11.

The bearing thus formed has two rows of O-type contact cylindrical rollers. As can be seen in the drawing, only surfaces 1b, 1c and 2a, 2d are loaded, that is, only these surfaces are in contact with the generatrixes of rollers 5 and 7, and surfaces 1a, 1d and 2b, 2c are not loaded. In the embodiment of FIG. 1, the surfaces 2b, 2c are interrupted by filling orifice 9 level with plug 10 and are replaced at this level by planar surfaces 10b, 10c, without the mechanical properties thereof being impaired.

Sealing rings 12, 13 ensure the sealing of the bearing and openings 14, 15 are provided on the circumference of the inner race member 2 for lubricating the annular spaces 3 and 4. Fixing holes 16 are provided on both race members but are only shown on the outer member. If required, the outer cylindrical portion of one of the race members can have teeth, not shown in the drawing.

During assembly of the bearing, race members 1, 2 are brought into the correct position with the plug 10 removed, so that the filling orifice 9 is open. Rollers 5 and 7 with their window guides 6 and 8 are introduced singly into the filling orifice 9 and are brought into position by an appropriate rotation. The plug 10 is then fitted and secured by pin 11.

In an alternative construction shown in FIG. 2, the single filling orifice 9 in inner race member 2 can be replaced by two filling orifices 19a, 19b in outer race member 1, which orifices extend respectively into non-loaded surfaces 1a and 1d. Two plugs 20a, 20b are fitted into and secured in orifices 19a, 19b, respectively to form surfaces 1a and 1d.

X-type bearings with two rows of cylindrical oblique contact rollers have loaded and non-loaded truncated cone-shaped surfaces which are the opposite to those of the O-type bearings with two rows of cylindrical truncated cone-shaped contact rollers. In this type of bearing the plugs must be arranged appropriately but this can be achieved without modifying the essential characteristics of the invention.

It is to be understood that various modifications in the structural details of the preferred embodiment described herein may be made within the scope of this invention and without departing from the spirit thereof. It is intended that the scope of this invention shall be limited solely by the hereafter appended claims.

What is claimed is:

1. A bearing having two rows of cylindrical oblique contact rollers, each row being located in an annular space defined between two annular monobloc race members, each said annular space containing a surface which is loaded and which forms a track for the rollers, and another surface which is non-loaded, and one of the race members having a filling orifice which extends into one of said annular spaces through a non-loaded surface thereof and through which the rollers can be inserted into said annular space.

2. A bearing as claimed in claim 1 in which one of the race members is provided with two orifices, each of which extends into one of the annular spaces through a non-loaded surface thereof, and a plug for closing each of said orifices.

3. A bearing as claimed in claim 2 in which each plug is made from a plastics material.

4. A bearing as claimed in claim 1 in which one of the race members is provided with an orifice which extends into both annular spaces through a non-loaded surface in each of said spaces, said orifice being closed by a plug.

5. A bearing as claimed in claim 4 in which said plug is made from the same material as the race members.

6. A bearing as claimed in claim 1 further comprising a roller cage in the form of window guides inserted at the same time as the rollers.

7. A bearing as claimed in claim 1, in which said two monobloc race members comprise an exterior annular monobloc race member and an annular interior monobloc race member and wherein each said annular space is limited by a loaded and a non-loaded surface provided on each said race member.

* * * * *